United States Patent [19]

Meyer et al.

[11] 4,411,970
[45] Oct. 25, 1983

[54] EQUALIZING BATTERY CELL BUSBAR

[75] Inventors: Theodore O. Meyer, Sunnyvale; Gerrit van Ommering, San Francisco, both of Calif.

[73] Assignee: Ford Aerospace & Communications Corporation, Detroit, Mich.

[21] Appl. No.: 321,514

[22] Filed: Nov. 16, 1981

[51] Int. Cl.³ .......................................... H01M 2/26
[52] U.S. Cl. .................................. 429/161; 429/101
[58] Field of Search ............................. 429/101, 161

[56] References Cited

U.S. PATENT DOCUMENTS

| | | | |
|---|---|---|---|
| 3,846,174 | 11/1974 | Barrett | 136/6 R |
| 3,899,351 | 8/1975 | Maurer et al. | 136/34 |
| 3,956,015 | 5/1976 | Rogers | 136/86 A |
| 4,004,067 | 1/1977 | Briggs et al. | 429/57 |
| 4,004,068 | 1/1977 | Briggs et al. | 429/57 |
| 4,038,461 | 7/1977 | Warnock | 429/101 |
| 4,098,962 | 7/1978 | Dennison | 429/72 |
| 4,115,630 | 9/1978 | van Ommering | 429/72 |
| 4,127,703 | 11/1978 | Holleck | 429/57 |
| 4,128,703 | 12/1978 | Mead et al. | 429/101 |
| 4,159,367 | 6/1979 | Berchielli et al. | 429/38 |

Primary Examiner—Donald L. Walton
Attorney, Agent, or Firm—Edward J. Radlo; Robert D. Sanborn

[57] ABSTRACT

Disclosed is a battery cell having positive and negative terminals penetrating the same end of the cell, and equalized internal resistance through all paths connecting electrode modules with the terminals. The equalized resistances insure uniform aging of electrode pairs, thus maximizing the life of the battery. A single equalizing busbar is inserted between the equalized terminal, which can be either the negative or the positive terminal, and that end of the equalized busbar remote from the terminaled end of the cell. The length and linear resistance increment of the equalizing busbar are independent of corresponding parameters for the equalized and non-equalized busbars. The resistance increment between any two adjacent electrode connections along each of the equalized and non-equalized busbars must be the same. A simple way to satisfy this condition is to make the length and linear resistance increment of the equalized and non-equalized busbars substantially equal.

6 Claims, 3 Drawing Figures

EQUALIZING BATTERY CELL BUSBAR

BACKGROUND OF THE INVENTION

1. Field of the Invention

This invention pertains to the field of battery cells, and in particular, metal-gas batteries, such as nickel hydrogen batteries.

2. Description of the Prior Art

A prior art search uncovered the following U.S. patent references:

U.S. Pat. No. 4,115,630 accomplishes one of the goals of the present invention, i.e., the equal aging of electrode modules by means of equalization of resistance among internal paths traversing all modules; however, this patent does not suggest how this goal can be accomplished with the further goal of locating both terminals at the same end of the cell. In fact, integral to the design of the U.S. Pat. No. 4,115,630, patent is the placement of each terminal along the cells's cylindrical axis, thereby precluding placement of both terminals at the same end.

U.S. Pat. No. 3,956,015 places both terminals on one side of the cell, although the terminals are perpendicular to the wall of the cell, unlike in the present invention. The U.S. Pat. No. 3,956,015 patent attempts to equalize the resistance within the cell for all module paths by means of utilizing individual leads from the terminals to each electrocde. The path resistances are not exactly equal, however, because there are always minor variations in sizing and connecting the leads. Furthermore, since the leads have to be insulated from each other, the resulting design is cumbersome, heavy, and unsuitable for spacecraft applications.

U.S. Pat. Nos. 3,899,351; 4,004,067; 4,004,068; 4,098,962; 4,127,703; 4,128,703; and 4,159,367 show battery cells with positive and negative terminals situated on the same end of the cell. However, none of the patents teaches the use of resistance balancing among module paths so as to prolong the life of the battery as in the present invention.

U.S. Pat. No. 3,846,174 shows resistance balancing within a module, but not from module to module.

SUMMARY OF THE INVENTION

In the battery cell of the present invention, two important goals are realized. First, both the negative and positive terminals enter the cell on the same end. This facilitates interconnections to the loads and keeps the conductor lengths short. This is very important in the case where weight and volume of a multicell battery must be minimized, such as in a spacecraft application.

The second important feature is that the inner geometry of the battery cell of the present invention is such that the electrodes age equally. This is critical where one wishes to prolong the life of the battery cell while minimizing weight, as in a spacecraft. This goal is accomplished by means of equalizing the resistances along all paths internal to the cell corresponding to all electrode modules. Thus, each module contributes an equal amount of power to the overall capability of the battery and ages equally.

The difficulty of accomplishing both goals simultaneously is exemplified by the large number of patents cited above describing battery cells which are unable to do so.

The present invention achieves the above goals by utilizing a single equalizing busbar connected between either the positive or the negative terminal and one of the conventional busbars (the "equalized" busbar) at a region at that end of the electrode stack opposite from the end of the cell where the terminals are situated. The equalized busbar is the positive busbar in the case where the equalizing busbar is connected to the positive terminal; similarly, the equalized busbar is the negative busbar in the case where the equalizing busbar is connected to the negative terminal.

Surprisingly, the equalizing busbar does not have to have the same resistance per unit length or the same length as either the positive or negative busbars, or as the conductor connecting the nonequalized terminal with the nonequalized busbar. As a general rule, the equalizing busbar should be kept as short as possible to minimize resistance losses and weight.

The resistance increment between any two adjacent electrode connections along each of the positive and negative busbars must be the same. A simple way to satisfy this condition is to provide the positive and the negative busbar (defined as extending only in the region of the electrode stack) with the same length and the same resistance per unit length. The internal resistance from positive to negative busbar within all electrode modules should be substantially the same.

DESCRIPTION OF THE DRAWINGS

These and other more detailed and specific objects and features of the present invention are more fully disclosed in the following specification, reference being had to the accompanying drawings, in which.

DETAILED DESCRIPTION OF THE INVENTION

Figure 1:
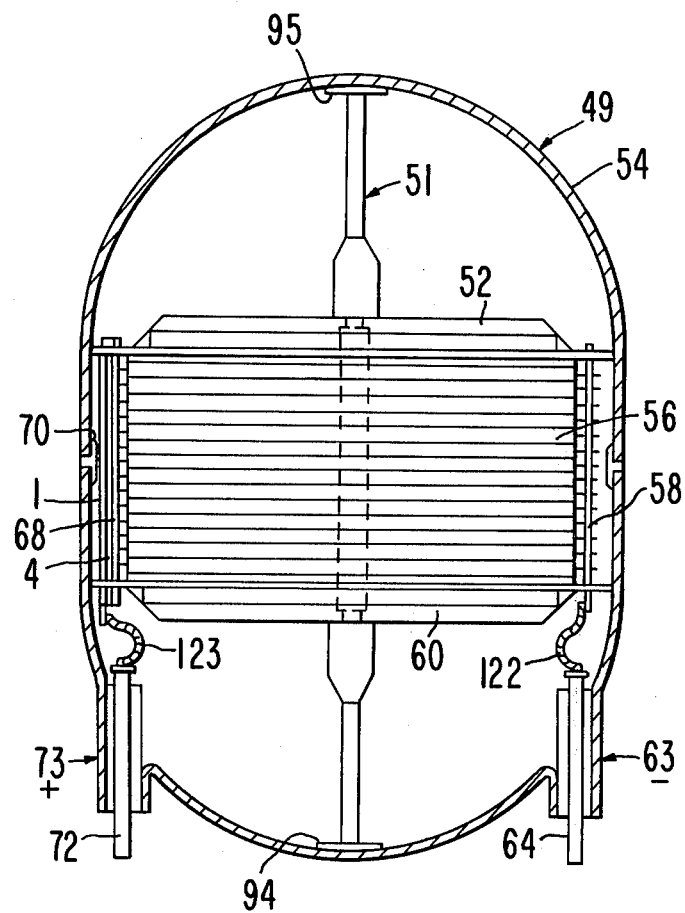
FIG. 1 is a partly schematic, partly cross-sectional side view of a battery cell utilizing the present invention.
Figure 3:
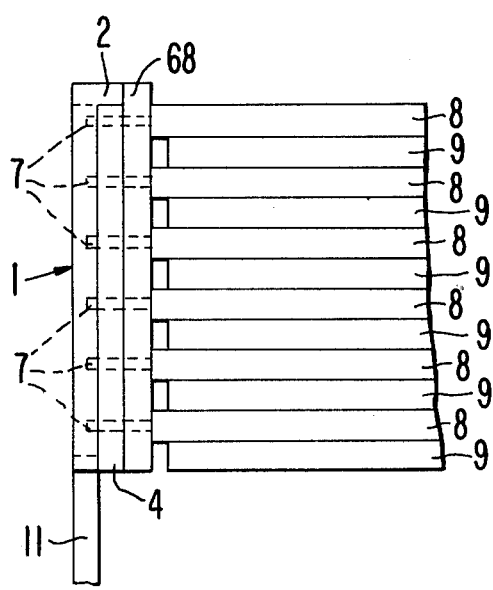
FIG. 3 is a side view of the embodiment illustrated in FIG. 2.

FIG. 1 illustrates a type of battery, a pressurized metal-gas battery cell 49, where the present invention has particular applicability. A reactant gas such as hydrogen permeates the interior of vessel 54. Electrode stack 56, comprising at least two electrode modules, contains the second reactant. Each module typically comprises one positive electrode 8, connected to positive busbar 68 (see FIG. 3), and one negative electrode 9, connected to negative busbar 58. Positive and negative electrodes are alternately stacked to form electrode stack 56. Separators, not shown, provide insulation between the electrodes and contain an electrolyte. Different separators may be present between modules, to permit access of reactant gas or provide electrical insulation. In the case where hydrogen is the first reactant, the negative electrodes 9 can be, for example, nickel catalyzed with platinum.

While the description herein is oriented around pressurized metal/gas cells as one example, the present invention can be advantageously utilized in any two-terminal battery cell having an electrode stack comprising at least two electrode modules, each module containing at least one positive and one negative electrode.

The shape of cell 49 is shown as an elongated right circular cylindrical sleeve terminating on each end by a portion of an ellipsoid. In the example illustrated, each end is a half sphere. This is an optimum geometry for containing a high pressure gas.

Penetrating the same end of cell 49 are positive terminal 73 and negative terminal 63.

Electrode stack 56 is supported by an elongated, typically cylindrical center rod 51 of insulating material which exerts axially outward pressure against the inside surface of vessel 54 via washers 95 and 94. Insulating end plates 52 and 60, in this case circularly shaped, compress electrode stack 56 axially inwardly, and provide radial pressure outwardly against the interior of vessel 54. Weld ring 70 is used to facilitate welding two portions of vessel 54 together during fabrication of cell 49.

Such a battery is described in more detail in a U.S. patent application by Meyer and Hickman entitled "Lightweight Metal-Gas Battery", Ser. No. 318,512, filed Nov. 5, 1981 commonly assigned with the present invention.

Terminal 63 contains therewithin a conductive feedthrough 64 electrically insulated from vessel 54, which is normally a conductor, such as a thin steel. Similarly, terminal 73 contains therewithin a conductive feedthrough 72 which is similarly electrically insulated from vessel 54. Preferably, terminals 63 and 73 are substantially parallel to the longitudinal axis of cell 49. A preferred means for constructing the dielectric seal between each of feedthroughs 64 and 72 and vessel 54 is described in U.S. patent application Ser. No. 297,374 filed Aug. 28, 1981, commonly assigned with the present invention.

Feedthrough 64 connects electrically with negative busbar 58 via flexible conductor 122. This terminal is illustrated as being the nonequalized terminal, although the negative terminal could just as readily be equalized, in which case terminal 73 would be the nonequalized terminal. Here, terminal 73 is shown as the equalized terminal. Feedthrough 72 connects electrically with equalizing busbar 1 via flexible conductor 123. Equalizing busbar 1 is connected to positive busbar 68 at just one region, along stack 56 at that end remote from terminal 73. Thus, positive busbar 68 is the equalized busbar and negative busbar 58 is the nonequalized busbar in this illustration.

Equalizing busbar 1 is always connected to the equalized busbar at only one region, i.e., at that end of electrode stack 56 opposite from the end of battery cell 49 through which terminals 73 and 63 protrude. The important consideration is that the equalized busbar not touch the equalizing busbar in the region alongside stack 56, because the resistance increment between any two adjacent electrode connections along each of the positive and negative busbars must be the same.

The operation of the present invention and the means by which the resistances through all electrode module paths are equalized can be understood by examining the following table. N is the resistance along the conductive path from the end of the nonequalized terminal (measured from the unconnected tip of feedthrough 72 or 64) to the nearest end of the nonequalized busbar. Thus, in the embodiment illustrated, N is the resistance from the unconnected tip of feedthrough 64 through conductor 122 to the point of negative busbar 58 alongside the bottom of stack 56.

M is the resistance through the path starting at that point of the equalized busbar alongside the top of stack 56 comprising equalizing busbar 1 plus the flexible conductor (123 or 122) plus the equalized feedthrough. Thus, here M is the resistance from the top of busbar 68 through bar 1 to the unconnected tip of positive feedthrough 72.

L is the resistance of each of the nonequalized busbar and the equalized busbar in the region of stack 56. The following chart shows the internal path resistances for three different electrode modules within electrode stack 56:

| Location of Electrode Module | Path Resistance Through Nonequalized Terminal | Path Resistance Through Nonequalized Busbar | Path Resistance Through Equalized Busbar | Path Resistance Through Equalizing Busbar and Equalized Terminal |
|---|---|---|---|---|
| Lowermost Module | N | 0 | L | M |
| Uppermost Module | N | L | 0 | M |
| Middle Module | N | L/2 | L/2 | M |

It can be seen from the above table that regardless of the location of the electrode module, the internal resistance within cell 49 along the path traversing said module is equal to $L+M+N+P$, where P is the resistance through each module. It can also be noted from the above that M is independent of L and N and thus does not have to be any particular value. This means that the resistance of bar 1 does not need to have any particular value. The length of bar 1 is independent of the length of each of the equalized and non-equalized busbars. The resistance per unit length of bar 1 is independent of the resistance per unit lenght of each of the equalized and non-equalized busbars. As a general rule, M should be kept as small as possible to minimize loss and equalizing busbar 1 should be kept as lightweight as possible, especially for space applications.

The resistance increments between any two adjacent electrodes along each of the equalized and nonequalized busbars must be the same. A simple way to satisfy this condition is to provide the equalized and nonequalized busbars with the same length and the same resistance per unit length. Also, the internal resistances P within each electrode module from the positive busbar to the negative busbar should be as equal as possible.

None of busbars 1, 68, or 58 should touch wall 54, to avoid electrochemical reactions taking place on wall 54 which would adversely affect the power output of cell 49.

Figure 2:
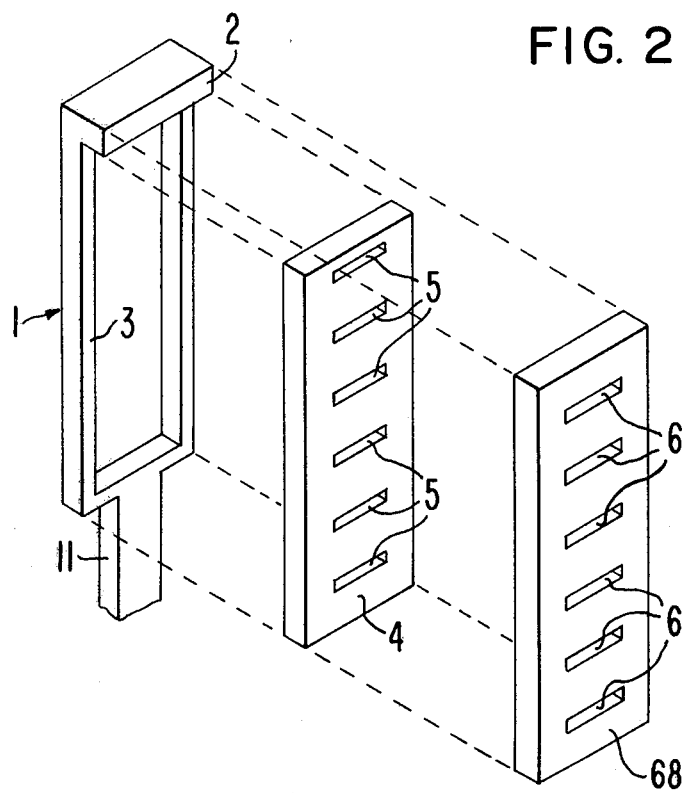
FIG. 2 is an exploded perspective view of one embodiment of the equalizing busbar of the present invention.

Since the above are the only limitations on the invention it can be readily appreciated that there are many possible ways of effectuating equalizing busbar 1. For example, it could be implemented in the form of a conductor passing through the center of insulating center rod 51 on its way to the equalized terminal. The embodiment illustrated is just one example of a working embodiment, and is seen in detail in FIGS. 2 and 3. We see that equalizing busbar 1 has a lower portion 11 which connects to the flexible conductor (123 or 122) and an elongated rectangular portion 3 cut out by means of a rectangular hole to permit the passage therethrough of tabs 7 without electrical contact being made between tabs 7 and busbar 1. Each tab 7 is the termination of an electrode of the same polarity as the equalized busbar; here, positive electrodes 8 and positive busbar 68. The function of each tab 7 is to provide a means for making electrical contact between each electrode 8 and busbar 68.

Busbar 68 is shown having the shape of an elongated rectangular bar having narrow rectangular slits disposed transverse to its long dimension. Slits 6 are dimensioned so as to accept tabs 7. Weld tabs may be preinserted in slits 6 to facilitate the welding of tabs 7 to busbar 68.

Equalizing busbar 1 has an upper ridge 2 which is welded, soldered, or otherwise conductively bonded to the top of busbar 68. This is the only region at which busbars 1 and 68 make contact. Insulator 4, shown having an elongated rectangular shape, is disposed between busbars 1 and 68 to insure that 1 and 68 will not touch in the region of stack 56. Insulator 4 can be cut through with a series of thin rectangular slits 5 disposed transverse to its long axis for accepting and providing mechanical support for tabs 7.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A battery cell comprising:
an electrode stack comprising at least two electrode modules, each module having at least one positive and one negative electrode;
a conductive positive terminal coupled to each of said positive electrodes;
a conductive negative terminal coupled to each of said negative electrodes; and
a conductive equalizing busbar coupled between only one of said terminals and said electrodes of the same polarity as the terminal to which said equalizing busbar is coupled, wherein said equalizing busbar tends to equalize the resistance in each path that comprises both terminals and one module;
wherein said cell has two opposing ends, and each of said terminals protrudes into said cell at the same end.

2. The battery cell of claim 1 further comprising:
a conductive positive connecting bar connecting each of said positive electrodes; and
a conductive negative connecting bar connecting each of said negative electrodes;
wherein said equalizing busbar is coupled between only one of said terminals and that connecting bar having the polarity of the terminal to which the equalizing busbar is coupled.

3. The battery cell of claim 2 wherein said equalizing busbar and the connecting bar to which it is coupled are connected only at that end of the electrode stack remote from the terminal to which said equalizing busbar is coupled.

4. The battery cell of claim 2 wherein the resistance increment between any two adjacent electrodes along each of the two connecting bars is the same.

5. The battery cell of claim 1 further comprising a positive connecting bar connected to each of the positive electrodes within said stack; and
a negative connecting bar connected to each of the negative electrodes within said stack;
wherein the equalizing busbar is coupled between only one of said terminals and that connecting bar having the same polarity as the terminal to which the equalizing busbar is coupled;
wherein said electrode stack has two ends, a first end adjacent to said terminals and a second end remote from said terminals;
wherein electrical connection between the equalizing busbar and the connecting bar is made only in the region of said second end of said electrode stack.

6. The battery cell of claim 5 wherein the resistance increment between any two adjacent electrodes along each of said connecting bars is the same; and
each module has substantially the same resistance between opposing connecting bars.

* * * * *